United States Patent [19]

Yamaguchi et al.

[11] Patent Number: 5,183,484
[45] Date of Patent: Feb. 2, 1993

[54] PROCESS FOR REMOVAL OF WATER IN RAW MATERIAL MIXED GAS

[75] Inventors: Akira Yamaguchi; Masaru Uno, both of Hyogo; Norio Sekikawa, Tokyo; Fumio Arai, Tokyo; Kenji Matsuzaki, Tokyo, all of Japan

[73] Assignee: Sumitomo Seika Chemicals Co., Ltd., Hyoga, Japan

[21] Appl. No.: 783,221

[22] Filed: Oct. 28, 1991

[30] Foreign Application Priority Data

Nov. 2, 1990 [JP] Japan .................. 2-298655

[51] Int. Cl.$^5$ .................................. B01D 53/02
[52] U.S. Cl. .................................. 55/34; 55/68; 55/390
[58] Field of Search .................. 55/34, 58, 68, 390

[56] References Cited

U.S. PATENT DOCUMENTS

| | | | |
|---|---|---|---|
| 3,176,446 | 4/1965 | Siggelin | 55/189 |
| 3,242,651 | 3/1966 | Arnoldi | 55/179 |
| 3,490,201 | 1/1970 | Colvin et al. | 55/31 |
| 4,726,815 | 2/1988 | Hashimoto et al. | 55/23 |
| 4,812,147 | 3/1989 | BeVier | 55/25 |

*Primary Examiner*—Bernard Nozick
*Attorney, Agent, or Firm*—Jones, Tullar & Cooper

[57] ABSTRACT

An improved process for recovery of $CO_2$ gas in a raw material mixed gas by a PSA apparatus. The process is characterized in that the removal of water in the raw material mixed gas is carried out by cooling the raw material mixed gas and passing it through a rotary dehumidification apparatus to remove water in the raw material mixed gas, and the regeneration of the rotary dehumidification apparatus is carried out by using as a gas for regeneration unadsorbed gas discharged from an adsorption step in the PSA apparatus with heating.

2 Claims, 1 Drawing Sheet

PROCESS FOR REMOVAL OF WATER IN RAW MATERIAL MIXED GAS

FIELD OF THE INVENTION

The present invention generally relates to recovery of $CO_2$ gas from a raw material mixed gas containing water by a pressure swing gas adsorption and separation method (hereinafter referred to as PSA method) and, particularly, it relates to a process for removal of water in the raw material mixed gas. More particularly, the present invention relates to a process for preventing water from accumulating in an adsorbent used in the PSA method by removing water according to a two-stage process of cooling dehumidification and adsorbing dehumidification upon recovery of $CO_2$ gas from a hot-blast stove exhaust gas, combustion exhaust gas or the like which contains water.

BACKGROUND OF THE INVENTION

As an adsorbent used in $CO_2$ gas separation and recovery by the PSA method, carbon molecular sieves, zeolite molecular sieves, activated charcoal and the like are known. However, generally, when water is accumulated in an adsorbent, in addition to a decrease in the amount of adsorbed $CO_2$ gas and the separation capacity, various problems such as powdering of the adsorbent and the like are caused, which results in difficulty in recovery of the $CO_2$ gas in high yield and high purity. Then, many attempts for removal of water in a raw material mixed gas have been proposed.

For example, JP-A 62-136222 proposes a process wherein a gas cooler or refrigerating dryer or the like is used as a dehumidification apparatus in order to bring an amount of water in a combustion exhaust gas to a degree of not higher than 20° C. as reduced in terms of the dew point.

Also, JP-A 1-172204 proposes a process for preventing water from accumulating in a zeolite molecular sieve adsorbent wherein alumina gel as a desiccant is packed at a lower part of the zeolite molecular sieve adsorbent, that is, at the raw material mixed gas inlet side, water in a raw material combustion exhaust gas is removed with this desiccant and then $CO_2$ gas separation is carried out at the upper part of the zeolite molecular sieve adsorbent.

On the other hand, as another process for removal of water, JP-A 1-108106 proposes a process wherein water in the raw material mixed gas is removed by pre-treating the raw material mixed gas according to a PSA method using a synthesized zeolite as an adsorbent before it is fed into a PSA apparatus.

Since the above-described various adsorbents, in particular, zeolite molecular sieves have especially high adsorbability of water and the water once adsorbed is difficult to be desorbed, water tends to accumulate in the adsorbent. Therefore, in the case of zeolite molecular sieves, more attention must be paid to the prevention of water accumulation. In order to solve this problem, the above-described JP-A 1-108106 discloses a process wherein PSA for the removal of water is provided as the pretreatment in addition to a $CO_2$ gas PSA main apparatus. However, in this process, it is unavoidable that the plant cost becomes higher, the operation procedures become complicated and the running cost also becomes higher.

Although the process described in JP-A 1-172204 uses alumina gel as a desiccant, the desiccant must be used in a large amount. Further, since the regeneration of the alumina gel which has absorbed water is carried out with a described gas ($CO_2$ gas), the desorbed $CO_2$ gas is consequently accompanied with water in a raw material mixed gas. Therefore, it is necessary to provide a vacuum pump for desorption having a considerably larger capacity to bring a gas corresponding to $CO_2$ gas and water vapor to evacuation. Furthermore, since much water drainage is formed at a $CO_2$ gas recovery line following the vacuum pump, corrosion-resistant materials are required in order to prevent corrosion. Furthermore, since the drying of $CO_2$ gas per se is required, there is such a problem that a dehumidification apparatus is also required in a post-treatment process.

Accordingly, in a process for separation of $CO_2$ gas by a PSA method using zeolite molecular sieves as an adsorbent, for example, in the case where $CO_2$ gas is recovered from a mixed gas containing water such as hot-blast stove exhaust gas, combustion exhaust gas or the like, it is desired to develop an excellent process for removal of water in the mixed gas while minimizing the above-described problems. In addition, a process for recovering $CO_2$ gas in an exhaust gas as high purity $CO_2$ using the exhaust gas as a raw material gas is a noticeable technique from the viewpoint of prevention of the recent green house effect of the earth.

OBJECTS OF THE INVENTION

The main object of the present invention is to provide a process for removal of water in a raw material mixed gas while minimizing the above-described problems.

This object as well as other objects and advantages of the present invention will become apparent to those skilled in the art from the following description with reference to the accompanying drawing.

SUMMARY OF THE INVENTION

Figure 1:
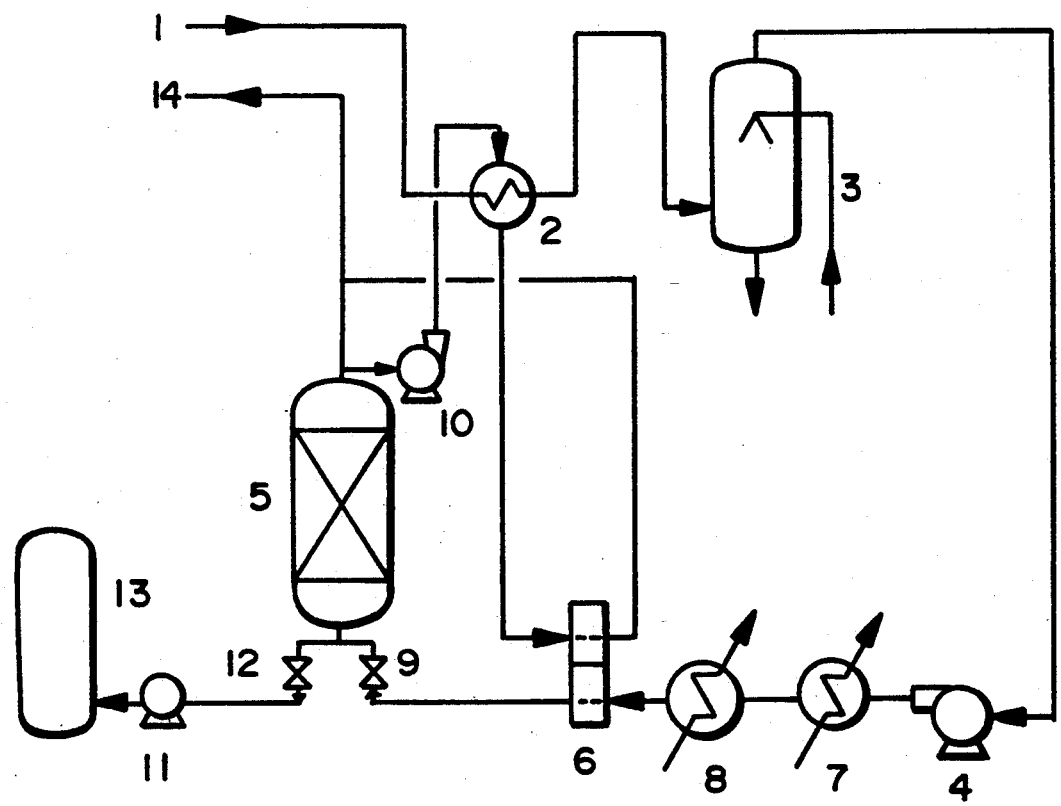
FIG. 1 is a flow sheet showing one embodiment of the process of the present invention.

An improved process for removal of water in a mixed gas to be used as a raw material in a PSA method, using a rotary dehumidification apparatus is proposed.

According to the present invention, there is provided an improved process for recovery of $CO_2$ gas in a raw material mixed gas by a PSA apparatus. The process is characterized in that the removal of water in the raw material mixed gas is carried out by cooling the raw material mixed gas and passing it through a rotary dehumidification apparatus to remove water in the raw material mixed gas, and the regeneration of the rotary dehumidification apparatus is carried out by using as a gas for regeneration unadsorbed gas discharged from an adsorption step in the PSA with heating.

DETAILED DESCRIPTION OF THE INVENTION

A rotary dehumidification apparatus is known [Kagakusochi (Chemical Apparatus), 1989, August, pages 54 to 59], and it has a rotor having a gas permeable structure such as a honeycomb structure or the like and containing as a main desiccant lithium chloride, silica gel or the like. The rotor rotates in a casing which is separated into a treating (dehumidifying) zone and a regeneration zone. Water in a raw material mixed gas to be treated is removed by silica gel or the like which is bound to the honeycomb in the rotor during passing through therein and the gas is discharged in the dried state from an outlet.

On the other hand, the honeycomb which has adsorbed water moves to the regeneration zone by the rotation of the rotor and the honeycomb is regenerated into the dried state by evaporation and desorption of water adsorbed therein with an inflow heated gas. Then, the honeycomb moves by the rotation to the treating zone again.

The process of the present invention can be applied to the PSA method using a raw material mixed gas containing 5 to 80 v/v % of $CO_2$ gas such as a hot-blast stove exhaust gas, a combustion exhaust gas or the like. In the process of the present invention, an unadsorbed gas which is discharged from a PSA apparatus is heated for use as a hot gas for regeneration in the above-described dehumidification apparatus. The unadsorbed gas which has passed through an adsorbent packed layer in the adsorber is in the dried state as a matter of course, an amount of water in the gas is very ( small such that it has a dew point of $-50°$ to $-70°$ C. and, therefore, when the gas is heated, a bone dried state of the gas can be obtained. When this gas is used as a heated gas for regeneration, extremely superior regeneration effects can be obtained in comparison with conventional processes wherein a merely heated gas is used. The heating method of the above unadsorbed gas is not limited. For example, when a hot-blast stove exhaust gas, a combustion exhaust gas or the like is used as a raw material gas, in view of energy saving or process system, it is significantly advantageous to carry out the heating by heat exchange between the exhaust gas and the unadsorbed gas.

Further, in the process of the present invention, an adsorbed gas ($CO_2$ gas) which has been desorbed in PSA operations is sucked in the direction opposite to introduction of the raw material mixed gas to use for drying the adsorbents at a raw material mixed gas inlet side part. That is, even if the above-described rotary dehumidification apparatus is used to remove water in the raw material mixed gas, a trace of water remains and this water is gradually accumulated in adsorbents in a raw material mixed gas inlet side part. Particularly, when zeolite molecular sieves are used as an adsorbent to recover $CO_2$ gas from a raw material mixed gas, since water is adsorbed more strongly than $CO_2$ gas, a part where adsorption of water is remarkable is formed at a raw material mixed gas inlet side upon termination of the adsorption step. Therefore, in this case, when an adsorbed $CO_2$ gas is desorbed by a vacuum pump, the suction is carried out in the direction opposite to introduction of the raw material mixed gas, the adsorbent is rinsed and dried with the dried $CO_2$ gas. Thus, water adsorbed by the adsorbent in a trace amount at a raw material mixed gas inlet side part in the adsorption step is rinsed and removed in the desorbing step. Since water in the desorbed $CO_2$ gas is negligible, further dehumidification is not required and the resultant gas per se can be used as a product gas.

An embodiment of the process of the present invention is illustrated below. In the following embodiment, $CO_2$ is recovered from a hot-blast stove exhaust gas with reference to the accompanying FIG. 1.

A hot-blast stove exhaust gas is introduced from an exhaust gas inlet 1 into a PSA apparatus 5 by an exhaust gas feed blower 4 via an exhaust gas-unadsorbed gas heat exchanger 2 and a scrubber 3. An unadsorbed gas which is heated by the heat exchanger 2 is introduced into a regeneration zone of a rotary dehumidification apparatus 6 and this is used to remove water adsorbed to a rotor of the dehumidification apparatus 6.

On the other hand, in the scrubber 3, an exhaust gas is subjected to the removal of dust which is contained therein in an small amount, and cooling. Since the gas discharged from the exhaust gas feed blower 4 is in the wet state, the gas is cooled and dehumidified by a cooler 7 with cooling water at ambient temperature, and then a cooler 8 with chilled water. Then, the gas is introduced into a dehumidifying zone of rotary dehumidification apparatus 6. The temperature of the exhaust gas after cooling and dehumidification with chilled water is suitably $0°$ to $15°$ C. When the temperature is lower than $0°$ C., water in the exhaust gas is frozen and it is not preferable. On the other hand, when the temperature exceeds $15°$ C., the regeneration temperature must be raised due to an increase in the water load in the rotary dehumidification apparatus 6 and, when the high temperature exhaust gas is introduced in a PSA apparatus packed with zeolite molecular sieves, the separation is affected adversely. Thus, by setting a temperature within the above-described range, the temperature of the exhaust gas discharged from the rotary dehumidification apparatus 6 becomes $20°$ to $50°$ C. which is a suitable temperature range for PSA operations in the PSA apparatus 5, which makes the effective $CO_2$ separation and recovery possible.

After adsorption and dehumidification in the apparatus 6, water in the exhaust gas is reduced to the degree which corresponds to a dew point of $-45°$ to $-50°$ C. The gas from which water has thus been removed is introduced into the PSA apparatus 5 through a raw material mixed gas inlet valve 9 and the adsorption step is carried out. A part of the unadsorbed gas which is discharged at the adsorption step is fed into the above-described heat exchanger 2 by a regeneration blower 10 to heat it. Since heating is carried out by the raw material mixed gas, i.e., the hot-blast stove exhaust gas, the temperature of the unadsorbed gas becomes $125°$ to $140°$ C. at a heat exchanger outlet and this temperature is sufficient for regeneration in the dehumidification apparatus 6. An unadsorbed gas which has not been used for heating is discharged from an unadsorbed gas outlet 14.

Then, the desorption of the adsorbed $CO_2$ gas by a vacuum pump 11 and the regeneration of the adsorbent are carried out simultaneously. The desorption of $CO_2$ gas is carried out by suction in the direction opposite to introduction of the raw material mixed gas through a $CO_2$ gas outlet valve 12 using the vacuum pump 11 as described above.

$CO_2$ gas thus obtained is stored in a $CO_2$ tank 13. In this embodiment, the number of the adsorber in the PSA apparatus 5 is one. However, likewise, water in the exhaust gas can be removed by using a plurality of adsorbers with similar operations.

The present invention can be sufficiently applied not only to a zeolite molecular sieve adsorbent but also to an activated charcoal adsorbent.

According to the present invention, a significant accumulation of water in an adsorbent is not observed and the lowering of the capacity of expensive adsorbents by water adsorption can be avoided. Therefore, the following advantages are obtained.

1) Since a product gas is obtained in the dried state, an apparatus for dehumidification of the product as in a conventional facility is not required and, therefore, the plant initial cost and the running cost are remarkably saved.

2) Since no water drain occurs in the product gas lines, there is no need to use corrosion-resistant materials in pipings and tanks and the plant initial cost can be reduced.

3) Since the inclusion of water in a product gas line is scarce, the capacity of a vacuum pump which is installed in a PSA apparatus can be reduced. The power of this vacuum pump occupies the majority of that of $CO_2$ gas recovery and, therefore, a significant decrease in electric power for $CO_2$ gas recovery is attained.

The following Example further illustrates the present invention in detail but is not to be construed to limit the scope thereof.

EXAMPLE 1

Referring to FIG. 1, the removal of water in a raw material mixed gas was carried out using a PSA apparatus equipped with three adsorbers. A hot-blast stove exhaust gas (temperature: 200° to 250° C., composition: $CO_2$ gas 23%, $N_2$ gas 70%, $O_2$ gas 2%, water 5%) was used as a raw material mixed gas, this was supplied to a scrubber at 22000 $Nm^3$/hour via a heat exchanger and, the cooling of the raw material mixed gas and the removal of dusts which were contained therein in a small amount were carried out, simultaneously.

The temperature of the gas which was discharged from the scrubber became 50° to 60° C. This gas was cooled and dehumidified by cooling water (ambient temperature) and chilled water (5° to 10° C.) to bring the temperature of the gas to about 10° C., and adsorbed and dehumidified by a rotary dehumidification apparatus (SSCR dehumidifier manufactured by Seibu Giken Co., Ltd., Japan) having a rotor composed of a combined body of honeycomb-like activated silica gel to remove water to a degree corresponding to a dew point of −45° to −50° C. As a gas for regeneration in the rotary dehumidification apparatus, 7000 $Nm^3$/hour of a PSA unadsorbed gas was used and it was subjected to heat exchange with the hot-blast stove exhausted gas at the above-described temperature to heat to 125° to 140° C. As a result, the temperature of the gas from which water had been removed became 35° to 40° C. at an outlet of the rotary dehumidification apparatus, and this gas was supplied to a PSA apparatus having three adsorbers of 2.8 m$\phi$ in inner diameter and 10 m in length which were packed with zeolite molecular sieves. At this time, in the desorption step, the suction was carried out in the direction opposite to gas introduction at the adsorption step using a vacuum pump (ultimate pressure: 30 to 60 torr) to obtain a product gas. The product $CO_2$ gas was obtained at the flow rate of 2900 $Nm^3$/hour. $CO_2$ purity was 99% and it was in the dried state of −30° to −40° C. as reduced in the terms of the dew point. The yield was 56.7%.

What is claimed is:

1. In a process for the recovery of $CO_2$ gas in a raw material mixed gas by a PSA method using a PSA apparatus, in which $CO_2$ gas is adsorbed with zeolite molecular sieves and then desorbed therefrom, the improvement comprising the steps of: cooling the raw material mixed gas with a cooler; passing the raw material gas through a rotary dehumidification apparatus to remove water in the raw material mixed gas at 0° to 15 C.; and regenerating the rotary dehumidification apparatus by using as a gas for regeneration unadsorbed gas discharged from an adsorption step in the PSA apparatus while heating the evaporate and deadsorb water from the rotary dehumidification apparatus.

2. In the process according to claim 1, wherein the $CO_2$ gas in the PSA method is sucked in in the direction opposite to the direction of introduction of the raw material mixed gas at a gas inlet side part of the PSA apparatus.

* * * * *